United States Patent
Suda et al.

(10) Patent No.: US 7,528,179 B2
(45) Date of Patent: May 5, 2009

(54) BLOCK POLYMER, POLYMER-CONTAINING COMPOSITION CONTAINING THE SAME, INK COMPOSITION AND LIQUID APPLYING METHOD AND LIQUID APPLYING APPARATUS UTILIZING THE POLYMER-CONTAINING COMPOSITION

(75) Inventors: Sakae Suda, Sagamihara (JP); Ikuo Nakazawa, Zama (JP); Koichi Sato, Atsugi (JP); Ryuji Higashi, Atsugi (JP); Masayuki Ikegami, Atsugi (JP); Keiichiro Tsubaki, Kawasaki (JP); Keiko Yamagishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 10/538,853

(22) PCT Filed: Jun. 24, 2004

(86) PCT No.: PCT/JP2004/009273

§ 371 (c)(1),
(2), (4) Date: Jun. 14, 2005

(87) PCT Pub. No.: WO2004/113408

PCT Pub. Date: Dec. 29, 2004

(65) Prior Publication Data

US 2006/0047015 A1    Mar. 2, 2006

(30) Foreign Application Priority Data

Jun. 25, 2003  (JP)  ............................. 2003-181256
Dec. 26, 2003  (JP)  ............................. 2003-434540

(51) Int. Cl.
C09D 11/00  (2006.01)
(52) U.S. Cl. ...................................... 523/160; 523/161
(58) Field of Classification Search ................ 523/160, 523/161
See application file for complete search history.

(56) References Cited

U.S. PATENT DOCUMENTS

| 5,085,698 | A | 2/1992 | Ma et al. ...................... 106/20 |
| 5,519,085 | A * | 5/1996 | Ma et al. ...................... 524/503 |
| 7,004,579 | B2 | 2/2006 | Sato et al. .................... 347/105 |
| 7,056,972 | B2 | 6/2006 | Nakazawa et al. .......... 524/505 |
| 7,067,590 | B2 | 6/2006 | Sato et al. .................... 525/299 |
| 2005/0033010 | A1 | 2/2005 | Sato et al. ..................... 528/80 |
| 2005/0131102 | A1 | 6/2005 | Nakazawa et al. .......... 523/160 |
| 2005/0140762 | A1 | 6/2005 | Sato et al. .................... 347/100 |
| 2005/0197424 | A1 | 9/2005 | Higashi et al. ............... 523/160 |
| 2005/0209367 | A1 | 9/2005 | Sato et al. .................... 523/161 |
| 2005/0219277 | A1 | 10/2005 | Sato et al. ........................ 347/1 |
| 2005/0239918 | A1 | 10/2005 | Nakazawa et al. .......... 523/160 |
| 2005/0249925 | A1 | 11/2005 | Ikegami et al. ........... 428/195.1 |
| 2006/0004124 | A1 | 1/2006 | Tsubaki et al. ............... 523/160 |
| 2006/0047015 | A1 | 3/2006 | Duda et al. .................. 523/160 |
| 2006/0050117 | A1 | 3/2006 | Sato et al. .................... 347/100 |
| 2006/0100310 | A1 | 5/2006 | Nakazawa et al. .......... 523/160 |
| 2006/0128828 | A1 | 6/2006 | Sato et al. .................... 523/160 |
| 2006/0146087 | A1 | 7/2006 | Sato et al. ..................... 347/21 |

FOREIGN PATENT DOCUMENTS

| EP | 0 556 649 A1 | 8/1993 |
| EP | 0 670 222 A2 | 9/1995 |
| EP | 0 819 538 A2 | 1/1998 |
| EP | 1 243 624 A1 | 9/2002 |
| EP | 1 371 696 A1 | 12/2003 |
| JP | 11-80221 | 3/1999 |
| JP | 11-322942 | 11/1999 |
| WO | WO 2004/005362 | 1/2004 |
| WO | WO 2004/063240 | 7/2004 |

OTHER PUBLICATIONS

Sadahito Aoshima et al., "Living Cationic Polymerization of Vinyl Monomers by Organoaluminum Halides," Polymer Bulletin, vol. 15, pp. 417-423 (1986).

Sadahito Aoshima et al., "Synthesis of Thermally-Induced Phase Separating Polymer with Well-Defined Polymer Structure by Living Cationic Polymerization," Dept. of Industrial Chemistry, Faculty of Science and Technology, Science of Tokyo, Noda, Chiba 278, Japan.

Annalen Der Physik, Vierte Folge. Band 25. pp. 376-445 (1908).

* cited by examiner

*Primary Examiner*—Edward J Cain
(74) *Attorney, Agent, or Firm*—Fitzpatrick, Cella, Harper & Scinto (57) ABSTRACT

A block polymer comprised of a polyalkenyl ether main chain comprises a first block segment having hydrophobicity; a second block segment having an upper limit hydration temperature exceeding 70° C.; and a third block segment having an ionic property. A polymer-containing composition comprises the block polymer, a solvent or a dispersing medium, and a functional substance. An ink composition comprises the polymer-containing composition wherein the functional substance is colorant. A liquid application method comprises the steps of preparing the polymer-containing composition; and applying the polymer-containing composition to a medium. A liquid application apparatus comprises a liquid application means which makes energy act on the polymer-containing composition to apply the composition; and a drive means which drives the liquid application means. The polymer compound is capable of satisfactorily dispersing a functional substance in a solvent.

8 Claims, 2 Drawing Sheets

BLOCK POLYMER, POLYMER-CONTAINING COMPOSITION CONTAINING THE SAME, INK COMPOSITION AND LIQUID APPLYING METHOD AND LIQUID APPLYING APPARATUS UTILIZING THE POLYMER-CONTAINING COMPOSITION

TECHNICAL FIELD

The present invention relates to a novel block polymer compound, a polymer-containing composition containing the same, an ink composition, a liquid applying apparatus and a head kit.

BACKGROUND ART

Aqueous dispersion material containing solid particles has been known as a functional material, examples of which include an agrochemical such as a herbicide or an insecticide, a pharmaceutical such as an anticancer drug, an anti-allergy drug or an anti-inflammatory drug, or a coloring material such as ink or toner containing a colorant as the solid particles. On the other hand, digital printing technologies have shown a remarkable progress in recent years. The digital printing technologies, represented by an electrophotographic technology and an ink jet technology, are showing increasing importance as the image forming technology for use in offices and homes.

Among such technologies, the ink jet technology has major advantages, as a direct recording method, of compactness and a low electric power consumption. Also, improvement in image quality is progressing rapidly, for example, by a fine nozzle formation. An example of the ink jet technology is a method of heating ink, supplied from an ink tank, with a heater provided in a nozzle, thereby generating a bubble in the ink and discharging the ink to form an image on a recording medium. Another example is a method of causing a vibration in a piezoelectric element for discharging the ink.

Since such ink jet technology generally employs an aqueous solution of a dye as the ink, there may result a diffusion of the image when colors are superposed, or a so-called feathering phenomenon may result along fibers of paper, in a recorded spot on the recording medium. Use of a pigment-dispersion ink is being considered in order to alleviate these phenomena. There are proposed a method of dispersing a pigment by a nonionic polymer, thereby sterically suppressing coagulation of the pigment, and, as disclosed in U.S. Pat. No. 5,085,698, a method of dispersing a pigment by an ionic block polymer including one each of a hydrophilic component and a hydrophobic component. Further improvements are desired, however, in dispersibility, by suppressing the coagulation resulting from an interaction of the particles, thereby achieving stable dispersion in a solvent over a prolonged time; in a color hue; and in a color-developing property.

DISCLOSURE OF THE INVENTION

The present invention has been made in consideration of such background technologies, and is to provide a block polymer compound capable of satisfactorily dispersing a functional substance in a solvent.

Also, the present invention is to provide an ink composition showing a high dispersion stability of a functional substance such as a pigment or a dye in a solvent, and exhibiting satisfactory color hue and a color-developing property in a printed image.

Furthermore, the present invention is to provide a liquid applying method utilizing the aforementioned ink composition and a liquid applying apparatus to be used therefor.

Furthermore, the present invention is to provide a head kit for containing and discharging the aforementioned ink composition.

The aforementioned objectives can be attained by the following aspects of the present invention.

According to an aspect of the present invention, there is provided a block polymer comprised of a polyalkenyl ether main chain comprising a first block segment having hydrophobicity; and a second block segment having an upper limit hydration temperature exceeding 70° C.; and a third block segment having an ionic property. The second block segment is preferably represented by a following general formula (1):

(1)

wherein A represents a unsubstituted or substituted polyvinyl group; B represents a unsubstituted or substituted linear or branched alkylene group with 1 to 15 carbon atoms; m represents an integer from 2 to 50; B is optionally different; and $R^1$ represents a hydrogen atom, $-CH_3$ or $-C_2H_5$. More preferably, the block segment represented by general formula (1) is represented by general formula (2):

(2)

wherein n represents an integer from 2 to 50; and $R^2$ represents a hydrogen atom, $-CH_3$ or $-C_2H_5$.

The third block segment is preferably a block segment showing anionic property.

The first block segment is preferably represented by general formula (3):

(3)

wherein $R^3$ is selected from a group consisting of a linear, branched or cyclic alkyl group with 1 to 18 carbon atoms, Ph, Pyr, Ph-Ph, Ph-Pyr, $-(CH(R^4)-CHR^5)-O)_p-R^6$ and $-(CH_2)_k-(O)_l-R^6$ in which a hydrogen atom in the aromatic ring is optionally substituted by a linear or branched alkyl group with 1 to 4 carbon atoms and a carbon atom in the aromatic ring is optionally substituted by a nitrogen atom; p represents an integer from 1 to 18; k represents an integer from 1 to 36; l represents 0 or 1; $R^4$ and $R^5$ each independently represent a hydrogen atom or $CH_3$; $R^6$ represents a linear, branched or cyclic alkyl group with 1 to 18 carbon atoms, Ph, Pyr, Ph-Ph, Ph-Pyr, $-CHO$, $-CO-CH=CH_2$, $-CO-C(CH_3)=CH_2$ or $-CH_2COOR^7$ in which a hydrogen atom in the aromatic ring is optionally substituted by a linear or branched alkyl group with 1 to 4 carbon atoms, F, Cl or Br, and a carbon atom in the aromatic ring is optionally substituted by a nitrogen atom; $R^7$ represents an alkyl group with 1 to 4 carbon atoms. In the present invention, -Ph represents a phenyl group, -Pyr represents a pyridyl group, -Ph-Ph represents a biphenyl group, and -Ph-Pyr represents a pyridylphenyl group. The pyridyl group, biphenyl group or pyridylphenyl group may be any of possible positional isomers.

The first block segment is preferably comprised of a single repeating unit structure.

According to another aspect of the present invention, there is provided a polymer-containing composition comprising the above block polymer, a solvent or a dispersing medium, and a functional substance. The functional substance is preferably enclosed in the block polymer.

According to a further aspect of the present invention, there is provided an ink composition comprising the polymer-containing composition, wherein the functional substance is colorant.

According to a further aspect of the present invention, there is provided a liquid application method comprising the steps of preparing the polymer-containing composition; and applying the polymer-containing composition to a medium.

According to a further aspect of the present invention, there is provided a liquid application apparatus comprising a liquid application means which makes energy act on the polymer-containing composition to apply the composition; and a drive means which drives the liquid application means.

According to a further aspect of the present invention, there is provided a head kit comprising a discharge head for discharging the above ink composition; and a container for containing the ink composition to be supplied to the discharge head.

The present invention allows the providing of a block polymer compound capable of satisfactorily dispersing a functional substance in a solvent.

BEST MODE FOR CARRYING OUT THE INVENTION

In the following, the present invention will be described in detail.

In a first aspect of the present invention, there is provided a block polymer compound characterized in being constituted by a polyalkenyl ether main chain and three or more types of block segments, including at least a first block segment having a hydrophobicity, a second block segment having an upper limit hydration temperature exceeding 70° C., preferably 80° C. and more preferably 90° C., and a third block segment having an ionic property.

The second block segment is preferably a block segment having a repeating unit structure represented by general formula (1). Preferably, the block polymer compound is characterized in that a principal constituent thereof is amphiphilic. Such amphiphilic property can be exhibited by at least a block segment in the block polymer compound of the present invention being nonaffinitive to a medium and at least a block segment being affinitive to the medium. As the medium to which the affinitive property and the nonaffinitive property are preferably exhibited, an aqueous medium is preferable. Stated differently, the block polymer of the present invention preferably includes at least one each of a hydrophobic segment and a hydrophilic segment.

More preferably, the block polymer has a block form of ABA type, ABC type, ABCD type or ABCA type. The block polymer may have block segments of 5 or more types, such as ABCDE type.

The term "block polymer" means a copolymer in which plural different polymer segments are connected in a polymer chain, and is therefore also called a block copolymer.

The polyalkenyl ether is preferably polyvinyl ether. This is because polyvinyl ether shows more flexible molecular mobility, and thus is capable of improving dispersion stability and enclosing property.

Also, an upper limit hydration temperature (also called lower critical solution temperature) means a temperature below which an affinity to the medium is exhibited and above which a non-affinity to the medium is exhibited. The upper limit hydration temperature can be measured, for example, by a method of preparing an aqueous solution of polymer and measuring an optical transmittance at 500 nm (The Journal of Polymer Science Part A: Polymer Chemistry, vol. 30, p. 2407 (1992). The aqueous solution of polymer shows a transmittance of 100% at or under the upper limit hydration temperature, but becomes turbid to decrease the transmittance above the upper limit hydration temperature. Thus, the upper limit temperature of hydration can be measured by measuring a temperature at which the transmittance shows a change.

The non-affinity to the medium and the affinity to the medium are preferably exhibited to an aqueous medium. Stated differently, the block polymer of the present invention preferably includes at least one each of a hydrophobic segment and a hydrophilic segment. More preferably, the block polymer has a block form such as ABA or ABC. In the present invention, the block polymer may be a graft polymer including a polyalkenyl ether structure, or a certain segment of the block polymer may be a copolymerized segment or a gradient segment.

The block polymer including three or more block segments to be used in the present invention includes at least a hydrophobic segment, and a block segment containing a repeating unit structure represented by the foregoing general formula (1) or a block segment showing an upper limit hydration temperature exceeding 70° C. Since the block segment having the repeating unit structure and the block segment showing an upper limit hydration temperature exceeding 70° C. under such temperature are hydrophilic, there is formed a micelle having the hydrophobic segment in a core portion and the hydrophilic segment in a shell portion, whereby a functional substance can be enclosed in the micelle particle. For example, if the functional substance is a colorant, there can be formed an ink composition of a colorant-enclosing type.

In the block segment having the repeating unit structure represented by the general formulas (1) and (2) of the present invention, repeating numbers m and n of the side chain are within a range of 2 to 50, preferably 2 to 20. A range of 2 to 20 is preferred because of a reduced entanglement of polymer chains, thus improving dispersibility in the solvent medium.

Also, the block segment having the upper limit hydration temperature preferably has an upper limit hydration temperature exceeding 70° C. With such temperature exceeding 70° C., in the storage of a polymer micelle dispersion enclosing a functional substance, the block segment constituting the shell portion shows hydrophilicity within a wider temperature range, whereby the hydrophilicity of the block segment is not easily lost even under an abrupt change in the external environment such as a temperature rise or an abrupt start of flow. Therefore, there is not easily generated coagulation or sedi- mentation among the micelle particles and the functional substance can be dispersed in stable manner. This fact exhibits an excellent effect particularly in an environment used, for example, in the ink jet recording. Therefore, for enclosing and stably dispersing a functional substance in an aqueous medium, the upper limit hydration temperature is preferably in excess of 70° C.

Also, as the upper limit hydration temperature becomes higher, the polymer micelles can exist more stably in a high temperature state. Therefore, if an ink composition obtained by employing a colorant as the functional substance is discharged from a liquid discharge apparatus such as an ink jet apparatus, the ink discharge becomes more stable and a higher color density (OD) is obtained as the upper limit hydration temperature increases. Therefore, the upper limit hydration temperature is preferably above 80° C. and more preferably above 90° C.

Now there will be given an explanation of the block polymer including the polyvinyl ether structure, to be employed in the present invention. Various syntheses have been reported on a polymer including a polyvinyl ether structure (for example Japanese Patent Application Laid-open No. 11-080221), among which there is known a method by a living polymerization by Aoshima et al. (Japanese Patent Application Laid-open No. 11-322942, Polymer Bulletin, vol. 15, p. 417 (1986)). A polymer synthesis by cationic living polymerization allows the synthesis of various polymers, for example, a homopolymer, a copolymer formed by two or more monomers, a block polymer, a graft polymer or a gradient polymer, with an exactly aligned length (molecular weight). Also, in the polyvinyl ether, various functional groups may be introduced in a side chain thereof. The cationic polymerization may be conducted in a $HI/I_2$ system or a $HCl/SnCl_4$ system.

Also, the block polymer including the polyvinyl ether structure may be a copolymer formed by vinyl ether and another polymer.

The block segment as represented by the foregoing general formula (1) in the present invention is preferably a block segment having a repeating unit structure represented by a following general formula (2). In the following, specific examples of the repeating unit structure represented by general formula (2) are shown:

-continued

The second block segment including the repeating unit structure represented by general formula (1) or (2) preferably has a polymerization degree of 5 to 500. A polymerization degree of 5 to 500 allows the obtaining of a sufficient hydrophilicity for enclosing a colorant and for becoming stably dispersible, and the providing of an ink composition of a viscosity dischargeable if recording with an ink jet printer or the like.

In the block polymer having three or more block segments to be used in the present invention, the hydrophobic block segment preferably includes a repeating unit represented by general formula (3). In the following, specific examples of the repeating unit structure represented by general formula (3) are set forth:

(wherein R represents a hydrogen atom or a linear or branched alkyl group with 1 to 4 carbon atoms).

The block segment showing hydrophobicity to be employed in the present invention is more preferably constituted of a single repeating unit structure. If the hydrophobic block segment is constituted of plural types of repeating unit structures, and if such repeating unit structures are different in polymerization speed or in solubility in the solvent, a repeating unit structure showing hydrophobicity of a certain level may be incorporated when the polymerization of the second block segment is executed in continuation. On the other hand, if the hydrophobic block segment is constituted of a repeating unit structure of a single type, the boundary with the second block segment becomes clearer, thereby increasing the block nature. Thus, the hydrophilicity is increased, whereby the polymer micelle particles enclosing the colorant can exist more stably in the aqueous medium and the ink discharge can be achieved more stably in the case of discharge with a thermal ink jet method based on bubble generation under the supply of thermal energy, thus also increasing the color density of the image formed by the discharge.

The block segment showing anionic property, to be employed in the present invention, preferably has a repeating unit structure represented by general formula (4):

(4)

In general formula (4), $R^8$ represents $—X—COO^-$; and X represents a linear, branched or cyclic alkylene group with 1 to 20 carbon atoms, $—(CH(R^9)—CH(R^{10}))—O)_p$ $—(CH_2)_r—$, $—(CH_2)_s—(O)_t—(CH_2)_u—$ or a structure in which at least one of methylene groups in these structures is substituted by a carbonylo group or an aromatic ring structure.

r represents an integer from 1 to 18; s represents an integer from 1 to 36; t represents 1 or 0; and u represents an integer from 1 to 18.

$R^9$ and $R^{10}$ each represent an alkyl group, and $R^9$ and $R^{10}$ may be mutually same or different.

Specific examples of the repeating unit structure showing anionic property and represented by general formula (4) are shown in the following:

(wherein Ph represents a phenylene group).

In the present invention, at least one anionic repeating unit structure represented by the general formula (4) has a content of 0.5 to 99 mol %, preferably 1 to 90 mol %. A range of 0.5 to 99 mol % is preferred as it allows carboxylic acid to fully exhibit interaction thereof, thereby sufficiently exploiting the function.

The amphiphilic block polymer preferably employed in the present invention can be synthesized by selecting, for example, a hydrophilic block segment from the repeating unit structure of the general formula (1), a hydrophobic block segment from the repeating unit structure of the general formula (3), and a block segment with an anionic property from the repeating unit structure of the general formula (4).

The block polymer of the present invention has a number-averaged molecular weight (Mn) from 200 to 10000000, preferably from 1000 to 1000000. With a molecular weight equal to or less than 10000000, the entanglement within the polymer chain or between the polymer chains is reduced such that easy dispersibility in the solvent is achieved. Also, the steric effect as a polymer can be fully exhibited with a molecular weight equal to or higher than 200. Each block segment preferably has a polymerization degree of 3 to 10000, more preferably 5 to 5000.

Also, for improving dispersion stability and enclosing property, a more flexible molecular movement of the block polymer is preferable as it can physically entangle with and become affinitive to the surface of the functional substance. For this purpose, a main chain of the block polymer preferably has a glass transition temperature Tg of 20° C. or less, more preferably 0° C. and still more preferably −20° C. or less. A polymer having a polyvinyl ether structure is also advantageous in this point as it is generally soft with a low glass transition temperature.

In the following, there will be explained a second aspect of the present invention.

A second aspect of the present invention provides a polymer-containing composition characterized in that it includes a solvent or a dispersion medium, a functional substance, and the first block polymer compound of the first aspect. It includes the above-mentioned block polymer and a functional substance exhibiting a specified useful function, such as a colorant, and the block polymer is advantageous in satisfactorily dispersing the functional substance.

The term "functional substance" means a substance exhibiting a specified function and includes a compound, a mixture, a solid, a liquid and a material of other forms, and examples include a substance usable as an agrochemical such as a herbicide or an insecticide, a substance usable as a pharmaceutical such as an anticancer drug, an anti-allergy drug or an anti-inflammatory drug, a substance usable as cosmetics such as a lip stick, a foundation, a cheek color, or a humectant cream, a colorant such as a dye, a pigment or a pigment for coloring, and other compositions. In the present invention, a colorant such as a dye, a pigment or a pigment for coloring is used advantageously.

In the present invention, the functional substance and the block polymer are dispersed as particles in the solvent, and such particles dispersed in the solvent can be, for example, dispersed particles constituted singly of a functional substance of a specified function, dispersed particles in which the functional substance is adsorbed in a hydrophilic portion of the block polymer, particles in which the functional substance is enclosed in the block polymer, or particles constituted singly of the block polymer. There is preferred a form in which the functional substance of the specified function is entirely enclosed in the block polymer. A preferred example of the form in which the functional substance is enclosed in the block polymer is a state where the functional substance is enclosed in polymer micelles formed by the block polymer.

In the dispersion composition of the functional substance of the present invention, the functional substance is preferably present in a content of 0.1 to 70 wt %, preferably 0.5 to 50 wt %. A content equal to or 0.1 wt % and higher allows the exhibiting of the specified function, and a content equal to or 70 wt % and less allows the obtaining of a viscosity suitable for the composition.

If the dispersion composition of the functional substance of the present invention is applied to an ink composition, an interaction of the particles, a particle size thereof, and a uniformity of the particle size significantly affect the stability, the coloring power, and the color saturation of the colorant-dispersed ink. More specifically, a coagulation among the particles dispersed in the solvent leads to a growth in the size of the particles, eventually leading to precipitation, whereby a stable ink dispersion composition cannot be obtained. Also, since the particle size and the coloring power are in an inversely proportional relationship (Annalen der Physik, 25, page 377 (1908)), the coloring power and the color saturation may be deteriorated if the particle size is large or if there is a wide particle size distribution even when the particle size is small.

The composition of the present invention is intended to stabilize the dispersion of the particles, and to improve the coloring power and the color saturation, and contains dispersed particles that preferably are suppressed from mutual coagulation, and have a small particle size and a narrow particle size distribution.

The block polymer, having three or more types of block segments, of the present invention includes at least a hydrophobic segment and a block segment having a repeating unit structure represented by the foregoing general formula (1) or a block segment having an upper limit hydration temperature exceeding 70° C. Since the block segment having the repeating unit structure represented by the foregoing general formula (1) and the block segment having an upper limit hydration temperature exceeding 70° C. at or less than such upper limit hydration temperature are hydrophilic, it is possible form micelle particles having the hydrophobic segment in a core portion and the hydrophilic segment in a shell portion, and to enclose a functional substance in the core portion of such micelle particles. For example, if the functional substance is a colorant, it is possible to form an ink composition of a colorant-enclosing type.

The block polymer employed in the present invention is more preferably a block polymer having a segment arrangement order of ABC, in which A represents the hydrophobic block segment, B represents the block segment represented by the general formula (1) or having the upper limit hydration temperature exceeding 70° C., and C represents the segment showing the anionic property. Such a block polymer forms, in an aqueous medium, micelle particles in which the hydrophobic block segment A is positioned in a core portion, the block segment B is positioned in a shell portion, and the block segment C is positioned outside the shell portion.

It is thus possible to enclose a colorant in the micelle formed by the block polymer, and to provide an ink composition of a colorant-enclosing type. Since the outside of the shell portion has an anionic repeating unit structure, the polymer micelle particles enclosing the colorant also show an anionic property. Consequently, the polymer micelle particles, being prevented from mutual coagulation by an electrical repulsive force and by a steric hindrance of the shell portion of the micelle, can be stably dispersed in the aqueous medium and can be given a very aligned uniform particle size in the dispersion composition. The possibility of obtaining such very aligned uniform particle size is also preferable. Furthermore, enclosure of the colorant in the polymer is preferred in improving the environmental stability. The enclosure of the functional substance in the polymer micelles can be formed due to the fact that the functional substance is not dispersed in the solvent in the absence of the polymer micelles and is liberated in the solvent when the polymer micelles are destroyed by some method. It can also be confirmed by observation, for example, under an electron microscope.

An average particle size of the block polymer micelle particles can be measured, for example, by a photon correlation method. In the present invention, there is principally employed a measurement by a dynamic light scattering method, which is a photon correlation method. As an index for the uniformity of the particle size, a dispersion index $\mu/G^2$ ($\mu$: second-order coefficient of cumulant expansion, G: attenuation factor) proposed by Gulari et al. (The Journal of Chemical Physics, 70, p. 3965 (1979)) is usually employed. This value can also be determined by the dynamic light scattering method. The DLS-7000 apparatus available from Otsuka Denshi Co. is an example of a particle size measuring apparatus that can perform measuring by the dynamic light scattering method.

In the present invention, the block polymer micelle particles enclosing the functional substance preferably have an average particle size of 200 nm or less, and a particle size distribution (dispersion index $\mu/G^2$) of 0.2 or less. An average particle size larger than 200 nm or a particle size distribution (dispersion index $\mu/G^2$) larger than 0.2 causes deterioration of the coloring power and the color saturation.

A composition, employing a colorant such as a dye, a pigment or a colored pigment as the functional substance included in the composition of the present invention, can be advantageously employed as an ink composition.

An explanation of the ink composition of the present invention will now be given.

Specific examples of the dye, organic pigment and inorganic pigment usable in the present invention are shown in the following.

The dye employable in the present invention can be a known dye, and can be a water-soluble dye such as a direct dye, an acidic dye, a basic dye, a reactive dye or a food dye, or an insoluble dispersion dye.

Examples of the water-soluble dye include direct dyes such as C.I. Direct Black −17, −62, −154; C.I. Direct Yellow −12, −87, −142; C.I. Direct Red −1, −62, −243; C.I. Direct Blue −6, −78, −199; C.I. Direct Orange −34, −60; C.I. Direct Violet −47, −48; C.I. Direct Brown −109; and C.I. Direct Green −59, acidic dyes such as C.I. Acid Black −2, −52, −208; C.I. Acid Yellow −11, −29, −71; C.I. Acid Red −1, −52, −317; C.I. Acid Blue −9, −93, −254; C.I. Acid Orange −7, −19; and C.I. Acid Violet −49; reactive dyes such as C.I. Reactive Black −1, −23, −39; C.I. Reactive Yellow −2, −77, −163; C.I. Reactive Red −3, −111, −221; C.I. Reactive Blue −2, −101, −217; C.I. Reactive Orange −5, −74, −99; C.I. Reactive Violet −1, −24, −38; C.I. Reactive Green −5, −15, −23; and C.I. Reactive Brown −2, −18, −33, and dyes such as C.I. Basic Black −2; C.I. Basic Red −1, −12, −27; C.I. Basic Blue −1, −24; C.I. Basic Violet −7, −14, −27; and C.I. Food Black −1, −2.

In the following, examples of commercially available oil-soluble dyes will be shown.

Examples of black oil-soluble dye include C.I. Solvent Black −3, −22:1 and −50.

Examples of yellow oil-soluble dye include C.I. Solvent Yellow −1, −25:1 and −172.

Examples of orange oil-soluble dye include C.I. Solvent Orange −1, −40:1 and −99.

Examples of red oil-soluble dye include C.I. Solvent Red −1, −111 and −229.

Examples of violet oil-soluble dye include C.I. Solvent Violet −2, −11 and −47.

Examples of blue oil-soluble dye include C.I. Solvent Blue −2, −43 and −134.

Examples of green oil-soluble dye include C.I. Solvent Green −1, −20 and −33.

Examples of brown oil-soluble dye include C.I. Solvent Brown −1, −12 and −58.

These examples of the colorant are particularly preferable for the ink composition of the present invention, but the colorant usable in the ink composition of the present invention is not particularly limited to the aforementioned colorants.

In the present invention, a pigment and a dye may be used in combination.

In the ink composition of the present invention, a dye is preferably employed in an amount of 0.1 to 50 wt % with respect to the ink weight. A dye amount less than 0.1 wt % may not provide a sufficient image density, and a dye amount exceeding 50 wt % may result in an excessively high viscosity. A more preferred range is from 0.5 to 30 wt %.

The pigment can be either of an organic pigment and an inorganic pigment, and the pigment employed in an ink is a black pigment and pigment of three primary colors of cyan, magenta and yellow. There may also be employed a chromatic pigment, a nonchromatic pigment or pale-chromatic pigment, or a metal luster pigment other than those mentioned above. Also, in the present invention, there may be employed a commercially available pigment or a newly synthesized pigment.

In the following, examples of black, cyan, magenta and yellow pigments will be given.

Examples of black pigment include Raven 1060 (manufactured by Columbian Carbon Co.), MOGUL-L (manufactured by Cabot Inc.), Color Black FW1 (manufactured by Degussa Inc.) and MA100 (manufactured by Mitsubishi Chemical Inc.).

Examples of cyan pigment include C.I. Pigment Blue-15:3, C.I. Pigment Blue-15:4 and C.I. Pigment Blue-15:6.

Examples of magenta pigment include C.I. Pigment Red-122, C.I. Pigment Red-123 and C.I. Pigment Red-146.

Examples of yellow pigment include C.I. Pigment Yellow-74, C.I. Pigment Yellow-128 and C.I. Pigment Yellow-129.

The pigment to be employed in the ink composition of the present invention is preferably employed in an amount of 0.1 to 50 wt % with respect to the ink weight. A pigment amount less than 0.1 wt % may not provide a sufficient image density, and a pigment amount exceeding 50 wt % may result in an excessively high viscosity. A more preferred range is from 0.5 to 30 wt %.

A solvent to be contained in the ink composition of the present invention is not particularly restricted, but means a medium capable of dissolving, suspending or dispersing ingredients contained in the ink composition. In the present invention, the solvent includes an organic solvent such as a linear, branched or cyclic aliphatic hydrocarbon, an aromatic hydrocarbon or a heterocyclic hydrocarbon, an aqueous solvent and water.

In particular, in the ink composition of the present invention, water and an aqueous solvent can be employed advantageously.

Examples of the aqueous solvent include a polyhydric alcohol such as ethylene glycol, diethylene glycol, triethylene glycol, polyethylene glycol, propylene glycol, polypropylene glycol or glycerin; a polyhydric alcohol ether such as ethylene glycol monomethyl ether, ethylene glycol monoethyl ether, ethylene glycol monobutyl ether, diethylene glycol monoethyl ether or diethylene glycol monobutyl ether; and a nitrogen-containing solvent such as N-methyl-2-pyrrolidone, a substituted pyrrolidone, or triethanolamine. Also, in the application for an ink, in order to accelerate drying on paper, there can also be employed a monohydric alcohol such as methanol, ethanol or isopropyl alcohol.

In the ink composition of the present invention, water and aqueous solvent mentioned above is employed with a content preferably within a range of 20 to 95 wt % with respect to the total weight of the aqueous dispersion. The content is more preferably within a range of 30 to 90 wt %. Also, the polymer-containing composition of the present invention is not prevented from containing components other than those mentioned in the foregoing, and may also contain additive such as an ultraviolet-absorbing agent, an antioxidant or a stabilizer.

In the ink composition of the present invention, the aforementioned block polymer is used with a content of 0.1 to 50 wt %, preferably 0.5 to 30 wt %. A content of the block polymer less than 0.1 wt % may be unable to sufficiently disperse the dye or the pigment contained in the ink composition of the present invention, and a content exceeding 50 wt % may result in an excessively high viscosity.

Also, in a preferred embodiment of the present invention, there is provided a functional substance dispersing composition which has a pH value of 5 or higher, and in which a functional substance and a block polymer are dispersed as particles in a solvent. More preferably the pH value is 7 or higher.

Furthermore, the aforementioned ink composition may have a responsiveness to a stimulus. Such stimulus responsiveness may be utilized, by giving a stimulus in the course of image formation, for example, to increase the viscosity of the ink thereby providing a satisfactory fixing property. The stimulus to be given is selected suitably, for the purpose of image formation, from among a temperature change, an exposure to an electromagnetic wave, a pH change, and a concentration change, for example.

The functional substance-dispersing composition of the present invention may change its status (characteristics) in response to various stimuli. In the present invention, examples of the "stimulus" include a temperature change; an application of an electric field; an exposure to a light (electromagnetic wave) such as an ultraviolet light, a visible light or an infrared light; a change in the pH of the composition; an addition of a chemical substance; and a change in the concentration of the composition.

The stimulus preferred in the present invention is as follows. Firstly, it is a temperature change over a range covering both sides of a phase transition temperature of the composition. Secondly, it is an exposure to an electromagnetic wave, and a wavelength range of such electromagnetic wave is preferably 100 to 800 nm. Thirdly, it is a pH change of the composition, of which the range is preferably from pH 3 to pH 12. Fourthly, it is a change in the concentration of the composition, for example, in a case where the concentration of the composition is changed by evaporation or absorption of the solvent of the composition or by a change in the concentration of the polymer dissolved in the composition. Such change in concentration preferably takes place over a range covering both sides of a concentration at which the composition undergoes a phase change. In the present invention, two or more stimuli may be provided in combination.

In the present invention, a state change caused in response to the stimulus can be, for example, a phase change from sol to gel, a phase change from a solution state to a solid state, or a change in the chemical structure. In the present invention, "stimulus responsiveness" means a change in the property of the composition of the present invention in response to such stimulus. More specifically, the stimulus responsiveness means that the shape or the physical property of the composition is changed significantly in response to a stimulus such as a temperature change, an electric field application, an exposure to an electromagnetic wave, a pH change, an addition of a chemical substance or a change in the concentration of the composition, applied thereto.

The property (state or characteristics) changing in the composition of the present invention may be selected in various manner according to the purpose of use of the composition of the present invention. In an example, the composition undergoes a phase change (for example, from sol to gel) in response to a stimulus, thereby improving the fixing property to a recording medium.

In the ink composition of the present invention, various additives and auxiliary agents may be added if necessary. Also, there may be employed a resin having both hydrophilic and hydrophobic portions. Such resin having both hydrophilic and hydrophobic portions can be, for example, a copolymer of a hydrophilic monomer and a hydrophobic monomer. Examples of the hydrophilic monomer include acrylic acid, methacrylic acid, maleic acid, fumalic acid, a monoester of carboxylic acids mentioned before, vinylsulfonic acid, styrenesulfonic acid, vinyl alcohol, acrylamide, and methacryloxyethyl phosphate. Examples of the hydrophobic monomer include a styrene derivative such as styrene or α-methyl styrene, vinylcyclohexane, a vinylnaphthalene derivative, an acrylate ester and a methacrylate ester.

Examples of the additive that may be contained in the composition of the present invention include a crosslinking agent, an acid-generating agent and a polymerization initiator, that are activated by application of heat or electromagnetic wave.

In the present invention, examples of other additives that can be added to the composition include a pH regulating agent for stabilizing ink and for attaining a stability to an ink pipe in a recording apparatus; a penetration agent for accelerating ink penetration into a recording medium, thereby expediting apparent drying; an antimold agent for preventing mold growth in the ink; a chelating agent for masking metal ions in the ink, thereby preventing a metal precipitation in a nozzle or a precipitation of insolubilities in the ink; a defoamer for preventing foam generation during circulation, movement or manufacture of the recording liquid; an antioxidant; a viscosity-regulating agent; an electroconductive agent; and an ultraviolet-absorbing agent.

In the following, there will be given a specific description of an ink composition for ink jet recording, constituting a preferred embodiment of the ink composition of the present invention. The ink composition of the present invention for ink jet recording can be prepared by adding a block polymer and a colorant to water and a water-soluble solvent, then dispersing the components by a disperser, eliminating coarse particles, for example, by centrifuging, and adding water or a solvent and additives, followed by agitation, mixing and filtration.

The disperser can be, for example, an ultrasonic homogenizer, a laboratory homogenizer, a colloid mill, a jet mill and a ball mill, which may be utilized singly or in combination.

[Liquid Application Method]

A liquid applying method of the present invention will be explained in the following.

The ink composition of the present invention is usable in various image forming apparatus based on various printing methods, an ink jet method or an electrophotographic method, and a pattern forming apparatus for a semiconductor process, and can be used in image formation by a liquid applying method utilizing such apparatus. The ink composition of the present invention is particularly preferably utilized in the ink jet method. The ink jet method to be utilized can be a known one such as a piezo ink jet method utilizing a piezoelectric element or a bubble jet (trade name) method based on bubble generation by thermal energy for recording. Also, there may be employed either of a continuous type and an on-demand type. The ink composition of the present invention can also be employed in a recording method in which ink is printed on an intermediate transfer member and is then transferred onto a final recording medium such as paper.

If the ink composition of the present invention having the stimulus responsiveness is employed as an ink for ink jet recording, it can be used, for example, in the following embodiments. The ink can be coagulated by the following stimuli (a) to (d):

(a) Case of ink responsive to temperature stimulus:

A temperature stimulus, caused by a difference between a temperature of the ink in the ink tank and a temperature of the ink on the recording medium on which the ink is applied by discharge, causes a phase change in the ink composition of the present invention, thereby rapidly inducing a viscosity increase or a coagulation of an insoluble component.

(b) Case of ink responsive to a stimulus by electromagnetic wave:

A stimulus by electromagnetic wave can be provided by a method of keeping the interior of the ink tank dark and exposing the ink to a visible light upon discharge, or by a method of emitting an electromagnetic wave from an electromagnetic wave irradiating unit provided in the ink jet recording apparatus. Such electromagnetic stimulus polymerizes a polymerizable functional group contained in the ink composition of the present invention for ink jet recording, thereby inducing a viscosity increase or a coagulation of an insoluble component.

(c) Case of ink responsive to a stimulus by a pH change:

Upon application onto a recording medium, the ink undergoes a change in the pH by the influence of such recording medium, and such pH change causes a phase change in the ink composition of the present invention, thereby inducing a viscosity increase or a coagulation of an insoluble component.

(d) Case of ink composition for ink jet recording responsive to a stimulus by a concentration change:

A change in the ink concentration, caused by a difference between an ink concentration in the ink tank and a concentration after water and aqueous solvent, contained in the discharged ink, are evaporated or absorbed in the recording medium, causes a phase change in the ink composition for ink jet recording of the present invention, thereby inducing a viscosity increase or a coagulation of an insoluble component.

A modification of such ink characteristics allows the alleviation of the color diffusion or the feathering phenomenon, and the exhibiting of excellent fixing property. The modification of the ink is not limited to viscosity increase or coagulation of the insoluble component mentioned above.

Also, various methods can be used for applying the stimulus. A preferred method is to mix or contact a stimulus applying substance, providing a stimulus, with the aforementioned stimulus-responsive ink. For example, for mixing a composition of a required pH with the pH-responsive ink described in (c), an ink jet method is applicable. It is possible, as disclosed in Japanese Patent Application Laid-open No. 64-63185, to deposit the stimulus applying substance, providing a stimulus, over the entire image forming area by an ink jet head, or, as disclosed in Japanese Patent Application Laid-open No. 8-216392, to control the amount of the stimulus applying substance, providing a stimulus, thereby forming a better image.

It is also possible to use the stimulus applying substance, providing a stimulus, in combination with an ink containing a dye or a pigment. For example, it is possible to alleviate the color diffusion by employing a stimulus-providing ink in any of the cyan, magenta, yellow and black (CMYK) inks to be employed in the color ink jet method and a stimulus-responding ink in another of the CMYK inks. The ink serving as the stimulus-responding ink and the ink serving as the stimulus-providing ink can be selected in various combinations among the CMYK inks, and the present invention may adopt any combination and does not limit the selection of the combination. Also, all the stimulus-response patterns mentioned above may be realized by the stimulus-providing composition and the stimulus-responding ink and are not particularly restricted.

[Liquid Application Apparatus]

A liquid applying apparatus of the present invention will be explained in the following.

An ink jet recording apparatus utilizing the ink composition of the present invention for ink jet recording includes that of piezo ink jet method utilizing a piezoelectric element and that of thermal ink jet method based on bubble generation by thermal energy for recording.

Figure 1:
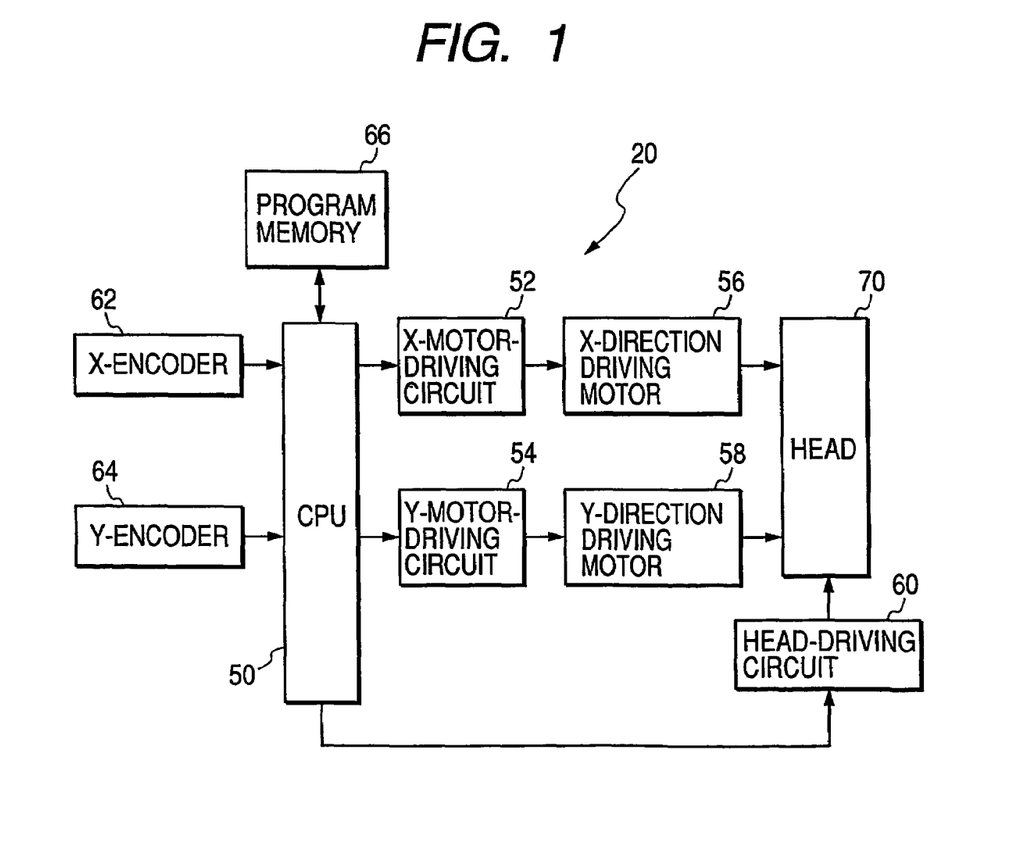
FIG. 1 is a schematic view showing a schematic configuration of an image recording apparatus of the present invention.

FIG. 1 is a schematic functional diagram of an ink jet recording apparatus 20, including a central processing unit (CPU) 50. A program for controlling the CPU 50 may be stored in a program memory 66 or memorized, as so-called firmware, in memory means such as EEPROM (not shown). The ink jet recording apparatus receives recording data from recording data preparation means (not shown) into the program memory 66. The recording data may be information of an image or a character to be recorded, or compressed information thereof, or encoded information. In the case of compressed or encoded information, such information may be expanded or developed by the CPU 50 to obtain the information of the image of the character to be recorded. An X-encoder 62 (for example, relating to an X-direction or a main scanning direction) and a Y-encoder 64 (for example, relating to a Y-direction or a sub scanning direction) are provided to inform the CPU 50 of a relative position of a head with respect to a recording medium.

Based on the information from the program memory 66, the X-encoder 62 and the Y-encoder 64, the CPU 50 transmits image recording signals to an X-motor-driving circuit 52, a Y-motor-driving circuit 54 and a head-driving circuit 60. The X-motor-driving circuit 52 and the Y-motor-driving circuit 54 respectively drive an X-direction drive motor 56 and a Y-direction drive motor 58, thereby moving a head 70 relative to a recording medium to a recording position. When the head 70 is moved to the recording position, the head-driving circuit 60 transmits a signal for discharging the ink compositions (Y, M, C, K) or the stimulus-providing substance to the head 70, thereby executing the recording. The head 70 may be so constructed as to discharge a monochromatic ink composition, or to discharge plural ink compositions, or also to have a function of discharging the stimulus-providing substance.

The ink composition of the present invention may be employed in an apparatus of a direct recording method in which the ink is directly applied to the recording medium, or an apparatus of an indirect recording method in which an image is formed with the ink on an intermediate transfer member bearing a latent image and is transferred to a final recording medium such as paper. It is furthermore applicable to an apparatus utilizing an intermediate transfer member of a direct recording method.

[Recording Apparatus]

A recording medium employed in the present invention will now be explained.

It is possible to mix or contact the stimulus-providing substance, constituting the stimulus, with the stimulus-responding ink as explained above, but it is also possible to provide the recording medium in advance with a mechanism of providing a stimulus. For example, there can be employed a method of employing an acid-responding ink as the pH-responsive ink and executing recording on an acidic paper; a method of employing a pH-responsive ink as a stimulus-responsive ink for recording on a recording medium capable of releasing a pH-changing substance in response to an application of heat, an electromagnetic wave or a pressure; or a method of employing a stimulus-responsive ink including a functional group capable of crosslinking or polymerization and executing recording on a recording medium releasing a crosslinking agent or a polymerization initiator in response to an application of heat, an electromagnetic wave or a pressure. In the present invention, the recording medium may have any known form, such as plain paper, a heat-sensitive paper or an acidic paper.

In the case of the direct recording method, the aforementioned recording medium is used as the final recording medium. On the other hand, in the case of the indirect recording method, the aforementioned recording medium may be employed as the intermediate transfer member or the final recording medium.

[Head Kit]

Figure 2:
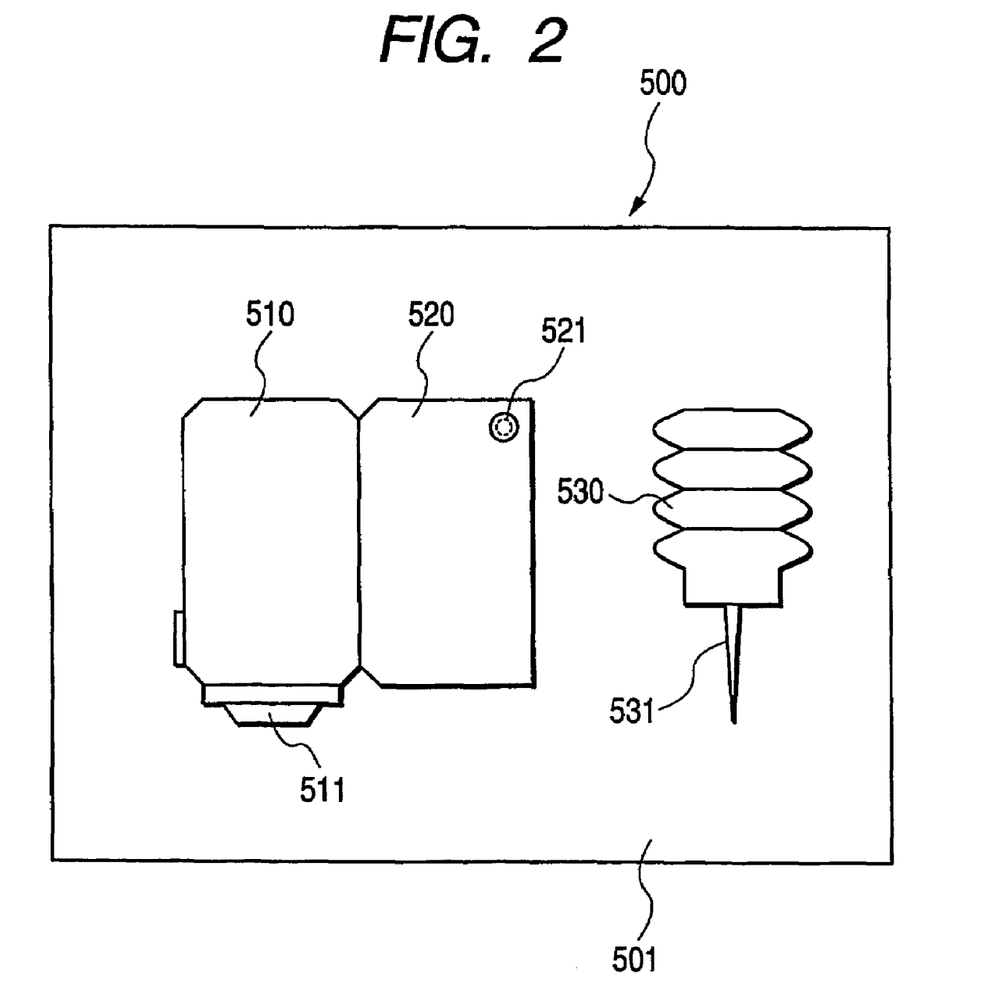
FIG. 2 is a schematic view showing a head kit of the present invention.

There will now be explained an ink jet head kit including an ink jet head for discharging the ink composition of the present invention. FIG. 2 is a schematic view showing such ink jet head kit 500, which contains, within a kit container 501, an ink jet head 510 having an ink discharge unit 511 for discharging the ink, an ink container 520 constituting a liquid container integral with or separable from the head, and ink filling means which contains ink to be filled into the ink container.

When the ink is exhausted, a part of an inserting part (for example, a needle) 531 of the ink filling means 530 is inserted into an air communicating aperture 521 of the ink container, a connection part with the ink jet head or a hole provided on a wall of the ink container, and the ink in the ink filling means can be filled into the ink container through such inserted portion.

By constructing such a kit including an ink jet head, an ink container, ink filling means etc. into a kit container, it is rendered possible, even when the ink is exhausted, to immediately or easily fill the ink container again with the ink, thereby re-starting the recording operation.

The ink jet head kit of the present invention has been explained by a form including the ink filling means, but the ink jet head kit may also have a form not provided with the ink filling means and only containing a separable ink container, filled with ink, and a head in the kit container 510.

Also, FIG. 2 only illustrates ink filling means for filling the ink container with the ink, but the ink container may also include bubble generating liquid filling means which is for filling a bubble generating liquid container with a bubble generating liquid, in addition to the ink container.

In the following, the present invention will be clarified further by examples, but the present invention is not limited to such examples.

EXAMPLE 1

Synthesis of Triblock Polymer poly[(IBVE-r-VEEt-PhPh)-b-MOEOVE-b-VEEtPhCOOEt] from Isobutyl Vinyl Ether and Biphenyloxyethyl Vinyl Ether (IBVE-r-VEEtPhPh: Block A), Diethyleneglycolmethyl Vinyl Ether (MOEVE: Block B), and Ethyl 4-(2-vinyloxy)ethoxybenzoate (VEEtPhCOOEt: Block C)

Hereinafter, b Indicates a Block Polymer and r Indicates a Random Polymer

A glass container equipped with a three-way stopcock was subjected to a nitrogen substitution, and was heated at 250° C.

in a nitrogen atmosphere to eliminate adsorbed water. After the system was returned to room temperature, 2.5 mmol (millimoles) of IBVE, 2.5 mmol of VEEtPhPh, 16 mmol of ethyl acetate, 0.05 mmol of 1-isobutoxyethyl acetate and 11 ml of toluene were added and the reaction system was cooled. When the temperature in the system reached 0° C., 0.2 mmol of ethylaluminum sesquichloride (equimolar mixture of diethylaluminum chloride and ethylaluminum dichloride) were added to initiate polymerization. The molecular weight was monitored from time to time by molecular sieve column chloromatography (GPC) to confirm completion of the polymerization of the block A.

Then 4.4 mmol of MOEOVE were added as a component of the block B, and the polymerization was continued. After the completion of the polymerization of the block B was confirmed by the GPC monitoring, 5.0 mmol of ethyl 4-(2-vinyloxy)ethoxybenzoate were added as a component of block C and the polymerization was continued. The polymerization reaction was terminated after 3 hours. The polymerization reaction was terminated by adding an ammonia/methanol-water solution of 0.3 mass % into the system. The reaction mixture was diluted with dichloromethane, and washed three times with 0.6 mol/L hydrochloric acid and three times with distilled water. The obtained organic phase was concentrated and dried in an evaporator, then dried under a reduced pressure, and was repeatedly subjected to a dialysis with a cellulose semipermeable membrane in a methanol solvent, to eliminate monomer compounds, whereby the desired block polymer was obtained. The compound was identified by NMR and GPC. It showed Mn=26500, Mw/Mn=1.34, and a polymerization ratio A:B:C=100:90:10. In the block A, two monomers showed a polymerization ratio of 1:1.

The obtained triblock polymer was subjected to a hydrolysis in a mixture of dimethylformamide and a sodium hydroxide aqueous solution to hydrolyze ethyl 4-(2-vinyloxy) ethoxybenzoate in block C, thereby obtaining a triblock polymer in a sodium salt state. The compound was identified by NMR and GPC.

Then a neutralization was executed with 0.1 N hydrochloric acid in an aqueous dispersion to obtain a triblock polymer: poly[(IBVE-r-VEEtPhPh)-b-MOEOVE-b-VEEtPhCOOH], as a result of the changing of 4-(2-vinyloxy)ethoxybenzoate in block C into free carboxylic acid. The compound was identified by NMR and GPC.

For measuring the upper limit hydration temperature of the block B segment MOEOVE, homopolymer poly(MOEOVE) was synthesized. 4.4 mmol of MOEOVE were employed as a monomer component. Other conditions of synthesis were the same as those in the synthesis of the triblock polymer.

The compound was identified by NMR and GPC, which provided Mn=12000 and Mw/Mn=1.18.

The obtained homopolymer was then dissolved in distilled water so as to have a concentration of 1 mass %, and was subjected to a measurement of optical transmittance at a wavelength of 500 nm within a range from 0 to 100° C. by a turbidity meter (manufactured by Youngwoo Instruments Inc.). The transmittance was 100% at 80° C. or less but became almost 0% at a temperature exceeding 80° C., with the solution showing turbidity. Thus the MOEOVE had an upper limit hydration temperature of 80° C.

Then, 26 mass parts of the obtained block polymer and 10 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with blue color. The oil-soluble dye was not separated or precipitated even after being allowed to stand for 10 days.

The dye dispersion composition obtained in the aforementioned process was subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. The measurement with the dynamic light scattering apparatus (DLS-7000, manufactured by Otsuka Denshi Co.) provided an average particle size of 81.3 nm and a dispersion index $\mu/G^2$ of 0.09.

The obtained ink composition was diluted 50 times, and was subjected to a measurement of a transmittance of light at 500 nm with a turbidity meter (manufactured by Youngwoo Instruments Inc.). A higher transmittance indicates a sharper color. The transmittance was 47%.

EXAMPLE 2

Synthesis of Triblock Polymer poly[TolOVE-b-MOEOVE-b-VEEtPhCOOEt] from 2-(4-methylbenzeneoxy)ethyl Vinyl Ether (TolOVE: Block A), diethyleneglycolmethyl Vinyl Ether (MOEOVE: Block B), and Ethyl 4-(2-vinyloxy)ethoxybenzoate (VEEtPhCOOEt: Block C)

A triblock polymer poly[TolOVE-b-MOEOVE-b-VEEtPhCOOEt] was synthesized in the same manner as in Example 1 except that the monomers of 2.5 mmol of IBVE and 2.5 mmol of VEEtPhPh in component A in Example 1 were replaced with 5.0 mmol of hydrophobic 2-(4-methylbenzeneoxy)ethyl vinyl ether (TolOVE). The synthesized compound was identified by NMR and GPC, resulting in Mn=25500, and Mw/Mn=1.18.

The obtained triblock polymer was subjected to a hydrolysis in a mixture of dimethylformamide and a sodium hydroxide aqueous solution to hydrolyze ethyl 4-(2-vinyloxy) ethoxybenzoate in block C, thereby obtaining a triblock polymer in a sodium salt state. The compound was identified by NMR and GPC.

Then a neutralization was executed with 0.1 N hydrochloric acid in an aqueous dispersion to obtain a triblock polymer: poly[TolOVE-b-MOEOVE-b-VEEtPhCOOH] as a result of the changing of 4-(2-vinyloxy)ethoxybenzoate in block C to free carboxylic acid. The compound was identified by NMR and GPC.

Then, 26 mass parts of the obtained block polymer and 10 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with blue color. The oil-soluble dye was not separated or precipitated even after being allowed to stand for 10 days.

The dye dispersion composition obtained in the aforementioned process was subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. There were obtained an average particle size d of 79.8 nm and a dispersion index $\mu/G^2$ of 0.09.

The obtained ink composition showed a transmittance, measured in the same manner as in Example 1, of 52%.

EXAMPLE 3

Synthesis of Triblock Polymer poly[TolOVE-b-MOEOEOVE-b-VEEtPhCOOEt] from 2-(4-methyl-benzeneoxy)ethyl Vinyl Ether (TolOVE: Block A), Triethyleneglycolmethyl Vinyl Ether (MOEOEOVE: Block B), and Ethyl 4-(2-vinyloxy)ethoxybenzoate (VEEtPhCOOEt: Block C)

A triblock polymer poly[TolOVE-b-MOEOEOVE-b-VEEtPhCOOEt] was synthesized in the same manner as in Example 2 except that 4.4 mmol of the block B monomer MOEOVE were replaced with triethyleneglycolmethyl vinyl ether (MOEOEOVE). The synthesized compound was identified by NMR and GPC, resulting in Mn=29600, and Mw/Mn=1.23. Other conditions of synthesis were the same as those in Example 1.

The obtained triblock polymer was subjected to a hydrolysis in a mixture of dimethylformamide and a sodium hydroxide aqueous solution to hydrolyze ethyl 4-(2-vinyloxy) ethoxybenzoate in block C, thereby obtaining a triblock polymer in a sodium salt state. The compound was identified by NMR and GPC.

Then a neutralization was executed with 0.1 N hydrochloric acid in an aqueous dispersion to obtain a triblock polymer: poly[TolOVE-b-MOEOEOVE-b-VEEtPhCOOH] as a result of the changing of 4-(2-vinyloxy)ethoxybenzoate in block C into free carboxylic acid. The compound was identified by NMR and GPC.

For measuring the upper limit hydration temperature of the block B segment MOEOEOVE, a homopolymer: poly (MOEOEOVE) was synthesized. 4.4 mmol of MOEOEOVE were employed as a monomer component. Other conditions of synthesis were the same as those in Example 1.

The compound was identified by NMR and GPC, with Mn=15000, and Mw/Mn=1.19.

The obtained homopolymer was then dissolved in distilled water so as to have a concentration of 1 mass %, and was subjected to a measurement of optical transmittance at a wavelength of 500 nm within a range from 0 to 100° C. by a turbidity meter (manufactured by Youngwoo Instruments Inc.). The transmittance was 100% at 90° C. or less but became almost 0% at a temperature exceeding 90° C., with the solution showing turbidity. Thus the MOEOEOVE had an upper limit hydration temperature of 90° C.

Then, 26 mass parts of the obtained block polymer and 10 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with blue color. The oil-soluble dye was not separated or precipitated even after being allowed to stand for 10 days.

The dye dispersion composition obtained in the aforementioned process was subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. There were obtained an average particle size d of 80.2 nm and a dispersion index $\mu/G^2$ of 0.09.

The obtained ink composition showed a transmittance, measured in the same manner as in Example 1, of 50%.

EXAMPLE 4

Synthesis of Triblock Polymer poly[TolOVE-b-MOEOEOEOVE-b-VEEtPhCOOEt] from 2-(4-methylbenzeneoxy)ethyl Vinyl Ether (TolOVE: Block A), Tetraethyleneglycolmethyl Vinyl Ether (MOEOEOEOVE: Block B), and Ethyl 4-(2-vinyloxy)ethoxybenzoate (VEEtPhCOOEt: Block C)

Wherein b Indicates a Block Polymer

A triblock polymer poly[TolOVE-b-MOEOEOEOVE-b-VEEtPhCOOEt] was synthesized in the same manner as Example 2 except that 4.4 mmol of the block B monomer MOEOVE were replaced with tetraethyleneglycolmethyl vinyl ether (MOEOEOEOVE). The synthesized compound was identified by NMR and GPC, resulting in Mn=33700, and Mw/Mn=1.25.

The obtained triblock polymer was subjected to a hydrolysis in a mixture of dimethylformamide and a sodium hydroxide aqueous solution to hydrolyze ethyl 4-(2-vinyloxy) ethoxybenzoate in block C, thereby obtaining a triblock polymer in a sodium salt state. The compound was identified by NMR and GPC.

Then a neutralization was executed with 0.1 N hydrochloric acid in an aqueous dispersion to obtain a triblock polymer: poly[TolOVE-b-MOEOEOEOVE-b-VEEtPhCOOH] as a result of the changing of 4-(2-vinyloxy)ethoxybenzoate into free carboxylic acid. The compound was identified by NMR and GPC.

For measuring the upper limit hydration temperature of the block B segment MOEOEOEOVE, a homopolymer: poly (MOEOEOEOVE) was synthesized. 4.4 mmol of MOEOEOEOVE were employed as a monomer component. Other conditions of synthesis were the same as those of the synthesis of the aforementioned triblock polymer.

The compound was identified by NMR and GPC, with Mn=19100, and Mw/Mn=1.20.

The obtained homopolymer was then dissolved in distilled water so as to have a concentration of 1 mass %, and was subjected to a measurement of optical transmittance at a wavelength of 500 nm within a range from 0 to 100° C. by a turbidity meter (manufactured by Youngwoo Instruments Inc.). The transmittance was 100% at 97° C. or less but became almost 0% at a temperature exceeding 97° C., with the solution showing turbidity. Thus the MOEOEOEOVE had an upper limit hydration temperature of 97° C.

Then, 26 mass parts of the obtained block polymer and 10 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with blue color. The oil-soluble dye was not separated or precipitated even after being allowed to stand for 10 days.

The dye dispersion composition obtained in the aforementioned process was subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. There were obtained an average particle size d of 80.9 nm and a dispersion index $\mu/G^2$ of 0.09.

The obtained ink composition showed a transmittance, measured in the same manner as in Example 1, of 49%.

COMPARATIVE EXAMPLE 1

A dispersion ink was prepared by employing a styrene-ethylene oxide diblock copolymer (number-averaged molecular weight=10600, number-averaged molecular weight ratio 36:70) and Oil Blue N as an oil-soluble dye, in a process that was the same as that in Examples 2 and 4. It had a blue color but showed a strong turbidity. There were obtained an average particle size d of 312 nm and a dispersion index $\mu/G^2$ of 0.9. A part of the oil-soluble dye was separated and precipitated after standing for 10 days.

The obtained dispersion was subjected to a centrifuge to collect supernatant liquid. Three supernatant liquids (A, B and C) in succession from the top showed [average particle size, dispersion index $\mu/G^2$] of A [235 nm, 0.44], B [285 nm, 0.52], and C [432 nm, 0.65]. All these liquids showed apparent turbidity. While the inks of Examples 1 to 4 showed scarce turbidity, the liquid A showed a strong turbidity.

The obtained ink compositions showed transmittances, measured in the same manner as in Example 1, of 25, 23 and 21% respectively for the liquids A, B and C.

EXAMPLE 5

A triblock polymer poly[EOVE-b-MOEOVE-b-VEEtPh-COOEt] was synthesized in the same manner as in Example 1 except that 2.5 mmol of IBVE and 2.5 mmol of VEEtPhPh of component A monomers were replaced with 5 mmol of 2-ethoxyethyl vinyl ether (EOVE) showing hydrophilicity at 20° C. and less and hydrophobicity at a temperature exceeding 20° C., which is the upper limit hydration temperature. The synthesized compound was identified by NMR and GPC, resulting in Mn=21100, and Mw/Mn=1.36.

Then, 26 mass parts of the obtained block polymer and 10 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. Oil Blue was not separated or precipitated even after being allowed to stand for 10 days.

The dye dispersion composition obtained in the aforementioned process was subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. There were obtained an average particle size d of 92.0 nm and a dispersion index $\mu/G^2$ of 0.09.

When this dye dispersion composition was cooled to 10° C. to collapse the polymer micelles and to dissolve the polymer into water, the dye and the dye solution were separated and the aqueous layer became colorless. This fact confirmed that the colorant was enclosed.

EXAMPLE 6

A triblock polymer poly[EOVE-b-MOEOVE-b-VEEtPh-COOEt], a triblock polymer poly[EOVE-b-MOEOEOVE-b-VEEtPhCOOEt] and a triblock polymer poly[EOVE-b-MOEOEOEOVE-b-VEEtPhCOOEt] were synthesized respectively in the same manner as in Examples 2, 3 and 4 except that 5 mmol of the component A monomer TolOVE were replaced with 5 mmol of 2-ethoxyethyl vinyl ether (EOVE) showing hydrophilicity at 20° C. or less and hydrophobicity at a temperature exceeding 20° C., which is the upper limit hydration temperature. The synthesized compounds were identified by NMR and GPC, resulting in Mn=20100, 24200 and 28000, and Mw/Mn=1.25, 1.26 and 1.26, respectively. Homo(EOVE) polymer was synthesized to measure the upper limit hydration temperature of EOVE, as in Example 1. Other conditions of synthesis were the same as those in Example 1.

Then, 26 mass parts of the obtained block polymer and 10 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. Oil Blue was not separated or precipitated in any of the ink compositions.

The dye dispersion compositions obtained in the aforementioned process were subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. There were respectively obtained, in the order of Examples 2, 3 and 4, an average particle size d of 93.1, 95.1 and 97.0 nm, and a dispersion index $\mu/G^2$ of 0.09, 0.09 and 0.08.

When each dye dispersion composition was cooled to 10° C. to collapse the polymer micelles and to dissolve the polymer into water, the dye and the dye solution were separated and the aqueous layer became colorless in all the dye dispersion compositions. This fact confirmed that the colorant was enclosed.

EXAMPLE 7

A fixing strength was evaluated with an ink composition prepared by selecting Oil Blue N as the oil-soluble dye in each of Examples 1 to 4. The ink composition was filled in a printing head of an ink jet printer (BJF800, manufactured by Canon Inc.) and was recorded with such ink jet printer on plain paper.

There was evaluated an ink for ink jet recording, responsive to a stimulus by a pH change.

In the recording with such ink for ink jet recording, a 5 wt % aqueous solution of polyacrylic acid of pH 2 was sprayed on plain paper constituting the recording medium, thereby preparing a recording medium capable of providing a stimulus. On such medium, an ink jet recording was executed in the same manner as explained above, and the recorded portion was strongly pressed with a finger after 30 seconds. None of the inks prepared in Examples 1 to 4 stuck to the finger.

When the aforementioned ink composition and a 5 wt % solution of polyacrylic acid of pH 2 were mixed, each of the inks immediately generated blue-colored gel.

COMPARATIVE EXAMPLE 2

5 mass parts of a self-dispersive black pigment (CAB-O-JET 300, manufactured by Cabot Inc.), 0.5 mass parts of a surfactant (Nonion E-230, manufactured by Nippon Yushi Co.), 5 mass parts of ethylene glycol and 89.5 mass parts of ion-exchanged water were mixed to prepare an ink composition. This ink composition was filled in a printing head of an ink jet printer (BJF800, manufactured by Canon Inc.) and was recorded with such ink jet printer on plain paper.

In the recording with such ink for ink jet recording, a 5 wt % aqueous solution of polyacrylic acid of pH 2 was sprayed on plain paper constituting the recording medium, thereby preparing a recording medium capable of providing a stimulus. On such medium, when an ink jet recording was executed in the same manner as explained above, and the recorded portion was strongly pressed with a finger after 30 seconds, the ink stuck to the finger.

EXAMPLE 8

26 mass parts of the block polymer obtained in each of Examples 1 to 4 and 10 mass parts of a black pigment Mogul L (manufactured by Cabot Co.) were co-dissolved in dimethylformamide and were converted into an aqueous phase with 500 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with black color. No separation or precipitation was observed in any example even after being allowed to stand for 10 days.

The dye dispersion compositions obtained in the aforementioned process were subjected to measurements of average particle size d and dispersion index $\mu/G^2$ of the dispersed particles by a dynamic light scattering apparatus (DLS-7000, manufactured by Otsuka Denshi Co.). The measurement was executed after dilution to 100 times with a sodium hydroxide aqueous solution of a same concentration so as to keep the pH constant. In the measurement with the dynamic light scattering apparatus (DLS-7000, manufactured by Otsuka Denshi Co.), there were respectively obtained, in the order of Examples 1, 2, 3 and 4, an average particle size d of 245.2, 230.0, 232.5 and 236.0 nm, and a dispersion index $\mu/G^2$ of 0.08, 0.09, 0.08 and 0.08.

Each of these ink compositions was filled in a printing head of an ink jet printer (BJF800, manufactured by Canon Inc.) and was recorded. 1 minute after the recording, the recording was rubbed strongly three times with a line marker, but no black trailing was observed in any ink composition, indicating a very strong fixing property.

EXAMPLE 9

13 mass parts of the block polymer obtained in Examples 1 to 4 and 5 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. Oil Blue was not separated or precipitated in any of the ink compositions. It was then added with 0.1 ml of a 0.1 N aqueous solution of sodium hydroxide, treated with an ultrasonic homogenizer for 10 minutes, and allowed to stand for 1 hour. It showed a pH value 12 with a pH test paper. The obtained dispersion was very transparent with blue color. No separation or precipitation of the oil-soluble dye was observed in any example even after standing for 10 days.

Then, ink compositions prepared with the block polymers obtained in Examples 1 to 4 were evaluated for an image color density (O.D.). Each ink composition was filled in a printing head of an ink jet printer (BJF800, manufactured by Canon Inc.) and was recorded on a bond paper (Ginkan, manufactured by Sanyo Kokusaku Pulp Co.). The block polymers obtained in Examples 1 to 4 provided a color density (O.D.) of the obtained image, measured with a reflective densitometer (RD-19A, manufactured by Sakata Inx Co.), of 0.92, 0.96, 1.10 and 1.12.

COMPARATIVE EXAMPLE 3

A triblock polymer poly[(IBVE-r-VEEtPhPh)-b-MOVE-b-VEEtPhCOOEt] was synthesized in the same manner as in Example 1 except that 4.4 mmol of the block B monomer MOEOVE were replaced with 2-methoxyethyl vinyl ether (MOVE). The synthesized compound was identified by NMR and GPC, resulting in Mn=22100, and Mw/Mn=1.24.

The obtained triblock polymer was subjected to a hydrolysis in a mixture of dimethylformamide and a sodium hydroxide aqueous solution to hydrolyze ethyl 4-(2-vinyloxy) ethoxybenzoate in block C, thereby obtaining a triblock polymer in a sodium salt state. The compound was identified by NMR and GPC.

Then a neutralization was executed with 0.1 N hydrochloric acid in an aqueous dispersion to obtain a triblock polymer: poly[(IBVE-r-VEEtPhPh)-b-MOVE-b-VEEtPhCOOH] as a result of the changing of 4-(2-vinyloxy)ethoxybenzoate in block C into free carboxylic acid. The compound was identified by NMR and GPC.

For measuring the upper limit hydration temperature of the block B segment MOVE, a homopolymer: poly(MOVE) was synthesized. 4.4 mmol of MOVE were employed as a monomer component. Other conditions of synthesis were the same as those of the synthesis of the aforementioned triblock polymer.

The compound was identified by NMR and GPC, with Mn=8000, and Mw/Mn=1.20.

The obtained homopolymer was then dissolved in distilled water so as to have a concentration of 1 mass %, and was subjected to a measurement of optical transmittance at a wavelength of 500 nm within a range from 0 to 100° C. by a turbidity meter (manufactured by Youngwoo Instruments Inc.). The transmittance was 100% at 70° C. or less but became almost 0% at a temperature exceeding 70° C., with the solution showing turbidity. Thus the MOVE had an upper limit hydration temperature of 70° C.

Then, 13 mass parts of the obtained block polymer and 5 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with blue color. The oil-soluble dye was not separated or precipitated even after being allowed to stand for 10 days.

Then, the obtained ink composition was evaluated for an image color density (O.D.). The ink composition was filled in a printing head of an ink jet printer (BJF800, manufactured by Canon Inc.) and was recorded on a bond paper (Ginkan, manufactured by Sanyo Kokusaku Pulp Co.). The color density (O.D.) of the obtained image, measured with a reflective densitometer (RD-19A, manufactured by Sakata Inx Co.), was 0.67.

COMPARATIVE EXAMPLE 4

A triblock polymer poly[(IBVE-r-VEEtPhPh)-b-EOVE-b-VEEtPhCOOEt] was synthesized in the same manner as in Example 1 except that 4.4 mmol of the block B monomer MOEOVE were replaced with 2-ethoxyethyl vinyl ether (EOVE). The synthesized compound was identified by NMR and GPC, resulting in Mn=23400, and Mw/Mn=1.23.

The obtained triblock polymer was subjected to a hydrolysis in a mixture of dimethylformamide and a sodium hydroxide aqueous solution to hydrolyze ethyl 4-(2-vinyloxy) ethoxybenzoate in block C, thereby obtaining a triblock polymer in a sodium salt state. The compound was identified by NMR and GPC.

Then a neutralization was executed with 0.1 N hydrochloric acid in an aqueous dispersion to obtain a triblock polymer: poly[(IBVE-r-VEEtPhPh)-b-EOVE-b-VEEtPhCOOH] as a result of the changing of 4-(2-vinyloxy)ethoxybenzoate into free carboxylic acid. The upper limit hydration temperature of EOVE was measured by synthesizing homo(EOVE) as in Example 1.

Other conditions of synthesis were the same as those in Example 1. As a result, EOVE had an upper limit hydration temperature of 20° C.

Then, 13 mass parts of the obtained block polymer and 5 mass parts of oil-soluble dye Oil Blue N (same trade name; manufactured by Aldrich Inc.) were co-dissolved in dimethylformamide and were converted into an aqueous phase with 400 mass parts of distilled water to obtain an ink composition. It was then added with 0.1 ml of a 0.1 N aqueous solution of sodium hydroxide, treated with an ultrasonic homogenizer for 10 minutes, and allowed to stand for 1 hour. It showed a value 12 with a pH test paper. The obtained dispersion was very transparent with blue color. The oil-soluble dye was not separated or precipitated even after being allowed to stand for 10 days.

Then the obtained ink composition was evaluated for an image color density (O.D.). The ink composition was filled in a printing head of an ink jet printer (BJF800, manufactured by Canon Inc.) and was recorded on a bond paper (Ginkan, manufactured by Sanyo Kokusaku Pulp Co.). The color density (O.D.) of the obtained image, measured with a reflective densitometer (RD-19A, manufactured by Sakata Inx Co.), was 0.60.

The invention claimed is:

1. A block polymer comprising a polyalkenyl ether main chain comprising:
   a first block segment having hydrophobicity;
   a second block segment having an upper limit hydration temperature exceeding 70° C.; and
   a third block segment having an ionic property,
   wherein the second block segment is represented by the following general formula (2):

wherein n represents an integer from 2 to 50; and $R^2$ represents a hydrogen atom, $—CH_3$ or $—C_2H_5$.

2. A block polymer according to claim 1, wherein the third block segment is a block segment showing anionic property.

3. A block polymer according to claim 1, wherein the first block segment is represented by general formula (3):

wherein $R^3$ is selected from the group consisting of a linear, branched or cyclic alkyl group with 1 to 18 carbon atoms, Ph, Pyr, Ph-Ph, Ph-Pyr, $—(CH(R^4)—CHR^5)—O)_p—R^6$ and $—(CH_2)_k—(O)_l—R^6$ in which a hydrogen atom in the aromatic ring is optionally substituted by a linear or branched alkyl group with 1 to 4 carbon atoms and a carbon atom in the aromatic ring is optionally substituted by a nitrogen atom; p represents an integer from 1 to 18; k represents an integer from 1 to 36; l represents 0 or 1; $R^4$ and $R^5$ each independently represent a hydrogen atom or $CH_3$; $R^6$ represents a linear, branched or cyclic alkyl group with 1 to 18 carbon atoms, Ph, Pyr, Ph-Ph, Ph-Pyr, $—CHO$, $—CO—CH=CH_2$, $—CO—C(CH_3)=CH_2$ or $—CH_2COOR^7$ in which a hydrogen atom in the aromatic ring is optionally substituted by a linear or branched alkyl group with 1 to 4 carbon atoms, F, Cl or Br, and a carbon atom in the aromatic ring is optionally substituted by a nitrogen atom; and $R^7$ represents an alkyl group with 1 to 4 carbon atoms.

4. A block polymer according to claim 1, wherein the first block segment comprises a single repeating unit structure.

5. A polymer-containing composition comprising the block polymer according to claim 1, a solvent or a dispersing medium, and a functional substance.

6. A polymer-containing composition according to claim 5, wherein the functional substance is enclosed in the block polymer.

7. An ink composition comprising the polymer-containing composition according to claim 5, wherein the functional substance is a colorant.

8. A liquid application method comprising the steps of:
   preparing the polymer-containing composition according to claim 5; and
   applying the polymer-containing composition to a medium.

* * * * *